United States Patent
Sandrasekaran et al.

(10) Patent No.: US 11,892,047 B2
(45) Date of Patent: Feb. 6, 2024

(54) BRAKE LEVER FOR A DRUM BRAKE ARRANGEMENT, SAID BRAKE LEVER BEING DESIGNED FOR TRANSMITTING THE MOVEMENT OF A CYLINDER ROD TO A BRAKE SHAFT

(71) Applicant: VOLVO TRUCK CORPORATION, Gothenburg (SE)

(72) Inventors: Ramachandran Sandrasekaran, Karnataka (IN); Sundar Vignesh Alavandar, Tamil Nadu (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/450,111

(22) Filed: Oct. 6, 2021

(65) Prior Publication Data

US 2022/0106993 A1    Apr. 7, 2022

(30) Foreign Application Priority Data

Oct. 7, 2020  (EP) .................................... 20200510

(51) Int. Cl.
    *F16D 65/60*    (2006.01)
    *F16D 65/50*    (2006.01)
    (Continued)

(52) U.S. Cl.
    CPC ............. *F16D 65/60* (2013.01); *F16D 65/50* (2013.01); *B60T 17/22* (2013.01); *F16D 2125/30* (2013.01)

(58) Field of Classification Search
    CPC .......... F16D 65/50; F16D 65/60; F16D 65/22; F16D 65/562; F16D 2125/30; F16D 2125/32; B60T 17/22
    See application file for complete search history.

(56) References Cited

U.S. PATENT DOCUMENTS

| 2,385,621 A | 9/1945 | Freeman et al. |
| 4,256,208 A * | 3/1981 | Najer .................. F16D 65/60 188/196 D |

(Continued)

FOREIGN PATENT DOCUMENTS

| EP | 0020127 A1 | 12/1980 |
| FR | 1330177 A | 6/1963 |

OTHER PUBLICATIONS

European Search Report and Written Opinion dated Feb. 5, 2021 in corresponding Europe Patent Application No. EP20200510.4, 6 pages.

*Primary Examiner* — Thomas W Irvin

(74) *Attorney, Agent, or Firm* — Venable LLP; Jeffri A. Kaminski

(57) ABSTRACT

The invention relates to a brake lever (20) for a drum brake arrangement (12), said brake lever being designed for transmitting the movement of a cylinder rod (14) to a brake shaft (22), wherein the brake lever (20) comprises a first portion (20a) delimiting a hole (24) for fitting the brake shaft (22) and a second portion (20b), which is configured to be pivotally connected to the cylinder rod (14) and wherein the first portion and the second portion are offset from each other with respect to a central axis (X24) of the hole (24). The brake lever further includes a stiffening member (28) that extends along a direction (L1) contained inside a plane (P1) perpendicular to the central axis (X24) of the hole and that includes an orifice (32) for fitting the brake shaft (22).

11 Claims, 6 Drawing Sheets

(51) Int. Cl.
*B60T 17/22* (2006.01)
*F16D 125/30* (2012.01)

(56) References Cited

U.S. PATENT DOCUMENTS

| | | | | |
|---|---|---|---|---|
| 4,580,665 | A * | 4/1986 | Saxton | F16B 37/043 403/11 |
| 5,222,579 | A * | 6/1993 | Frania | F16D 65/60 188/79.55 |
| 6,105,730 | A * | 8/2000 | Ekeroth | F16D 66/025 324/207.2 |
| 8,820,490 | B2 * | 9/2014 | Hayford | F16D 65/50 188/196 C |
| 9,574,626 | B1 * | 2/2017 | Berwanger | F16D 65/60 |
| 11,209,062 | B2 * | 12/2021 | Deshpande | F16D 65/58 |
| 11,293,506 | B2 * | 4/2022 | Gunasekaran | F16D 65/60 |
| 2013/0240307 | A1 * | 9/2013 | Hayford | F16D 65/50 188/196 C |
| 2017/0038000 | A1 | 2/2017 | Füchsle et al. | |
| 2020/0088255 | A1 * | 3/2020 | Gunasekaran | F16D 65/60 |
| 2020/0362930 | A1 * | 11/2020 | Deshpande | F16D 65/58 |
| 2022/0010854 | A1 * | 1/2022 | Heman | F16D 66/02 |

* cited by examiner

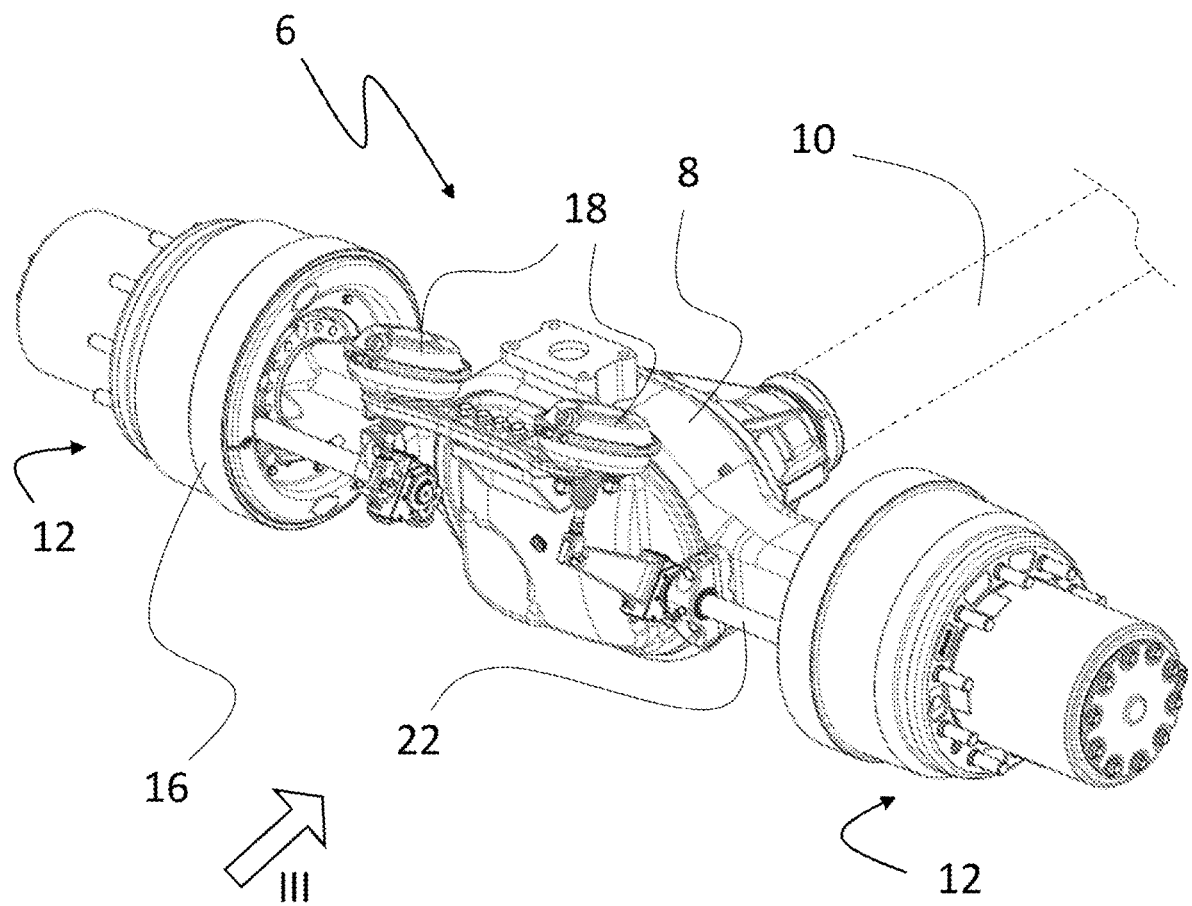
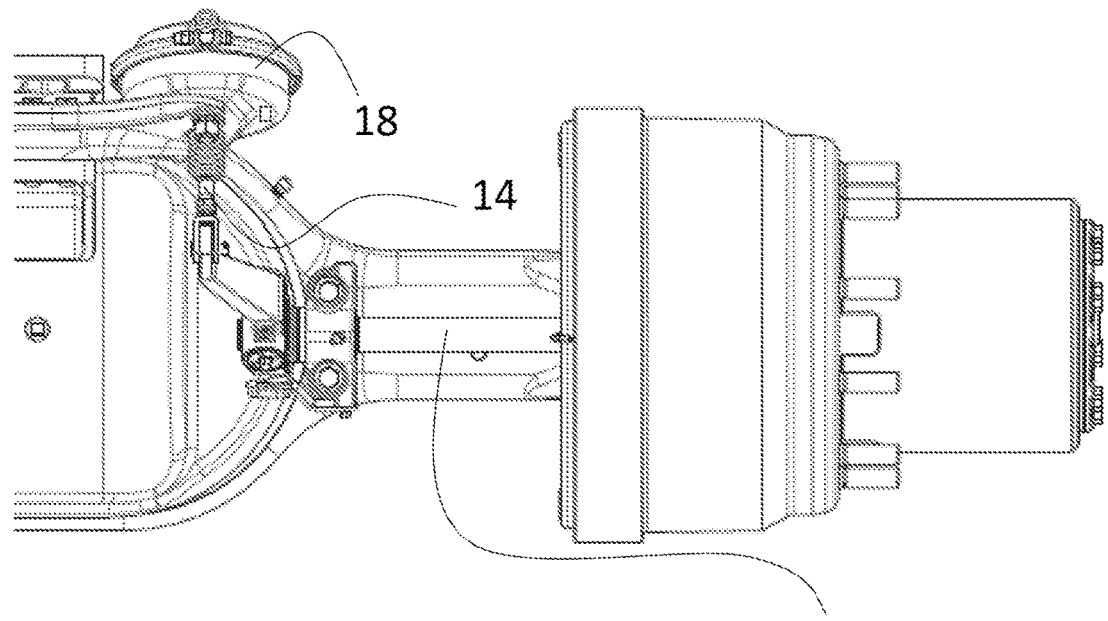
FIG.3

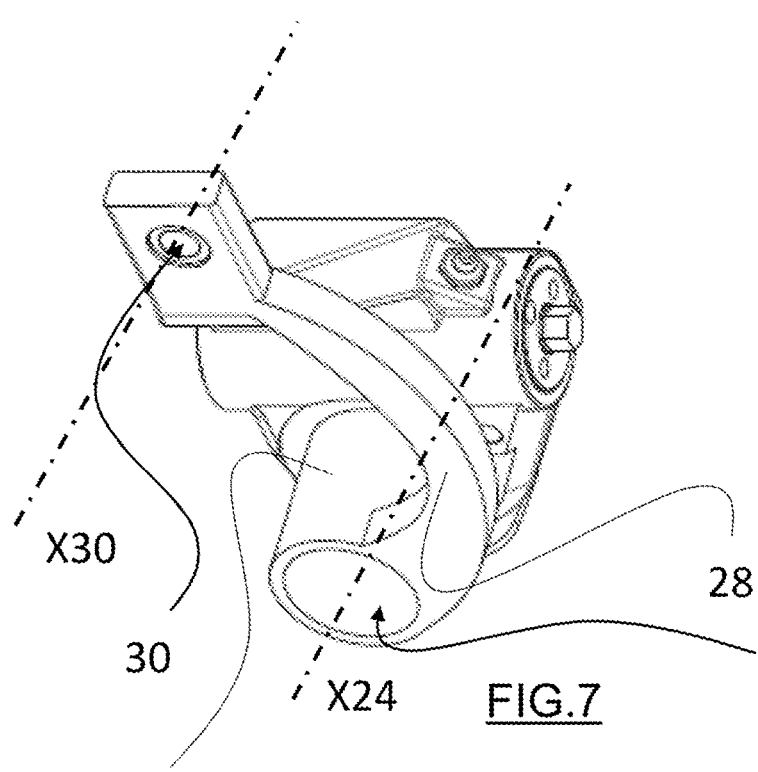
FIG.7
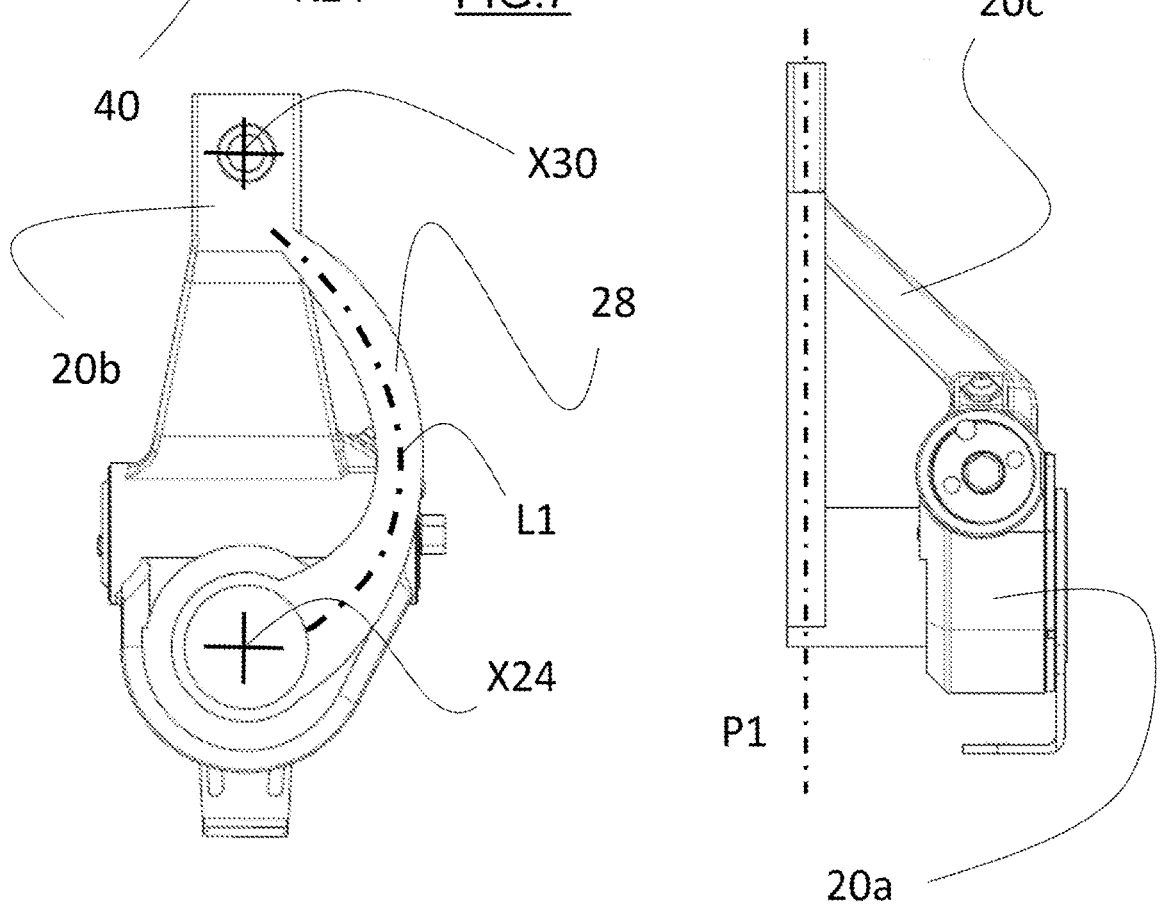
FIG.8
FIG.9

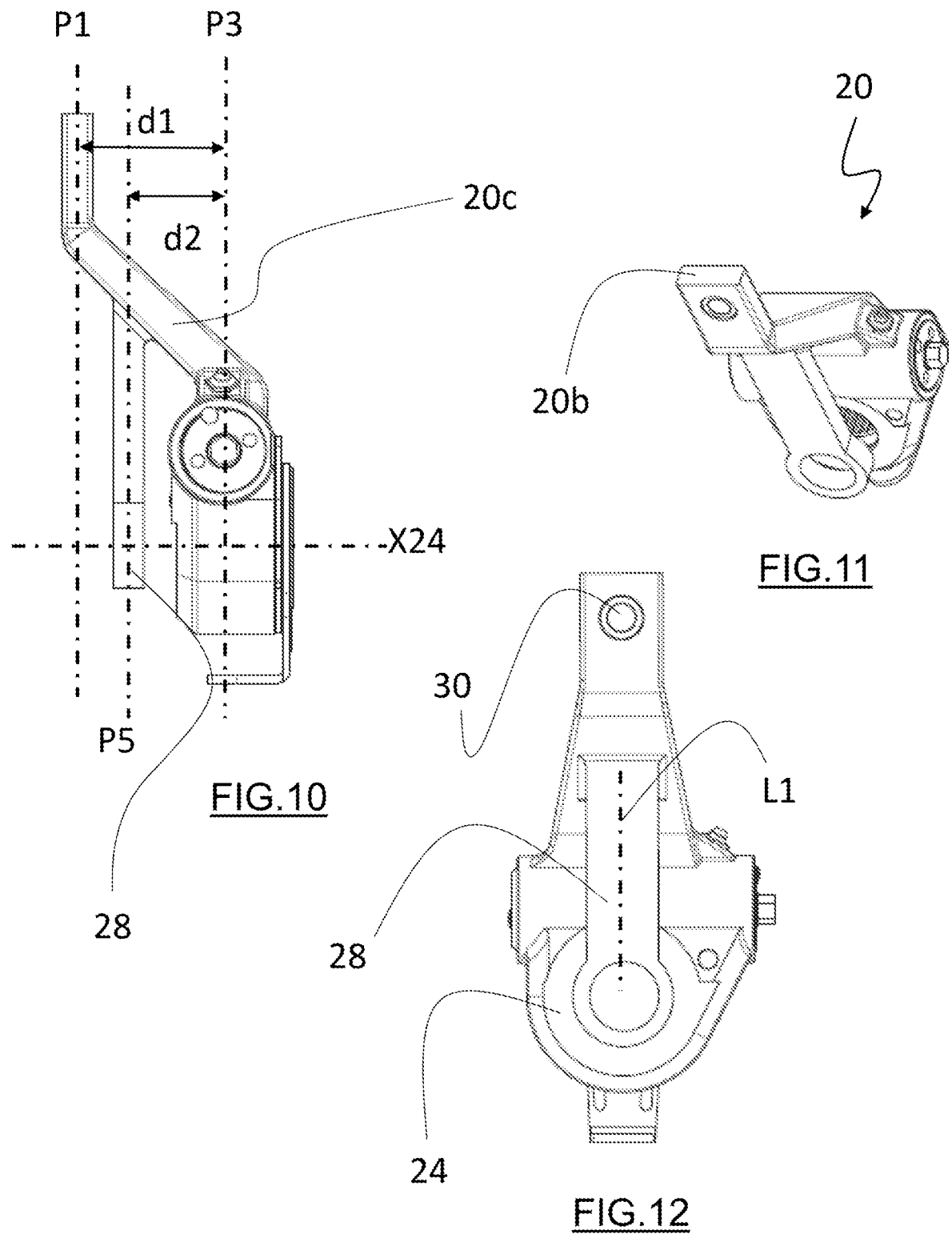

BRAKE LEVER FOR A DRUM BRAKE ARRANGEMENT, SAID BRAKE LEVER BEING DESIGNED FOR TRANSMITTING THE MOVEMENT OF A CYLINDER ROD TO A BRAKE SHAFT

TECHNICAL FIELD

The invention relates to a brake lever for a drum brake arrangement, said brake lever being designed for transmitting the movement of a cylinder rod to a brake shaft.

The invention can be applied in heavy-duty vehicles, such as trucks, buses and construction equipment. This means that although the invention will be described with respect to a truck, the invention is not restricted to this particular vehicle, but may also be used in other vehicles such as buses, construction equipment, military vehicles and so on.

BACKGROUND

Air brakes or, more formally, compressed air brake systems, are a type of friction brake for vehicles in which compressed air pressing on a piston is used to apply the pressure to the brake pad needed to stop the vehicle.

Air brakes are typically used on heavy trucks and buses. On this type of vehicle, the brake system consists of a service brake, a parking brake, a control pedal and an air storage tank. For the parking brake, there is a disc or drum brake arrangement, which is designed to be held in the "applied" position by spring pressure. Air pressure must be produced to release these "spring brake" parking brakes. For the service brake (i.e. the one used while driving for slowing or stopping) to be applied, the brake pedal is pushed, routing the air under pressure to the brake chamber, causing the brake to be engaged. Most types of truck air brakes are drum brakes, though there is an increasing trend towards the use of disc brakes.

A drum brake is a wheel brake that is applied by brake shoes being pressed against a brake drum. There are a number of different types of drum brakes, where the difference lies in the mechanism that transmits the braking force from the brake cylinder to the brake lining. In particular, drum brakes include cam brakes and wedge brakes.

In a cam brake, the brake cylinder converts the energy of compressed air to mechanical operation. It consists of two chambers separated by a rubber diaphragm. When the brake pedal is depressed, air flows into the cylinder and pushes the diaphragm against a push rod. This causes the push rod to move out from the cylinder and to push on a rotating lever (also known as "brake lever" or "brake arm"). The rotating lever transforms the force of the push rod into a torque that is applied to a brake shaft. A cam, e.g. a S-shaped cam, is arranged at the end of the brake shaft. As the cam rotates, it forces two symmetrical brake pads against the brake drum until the pressure is released and the brake pads return to their resting position. The brake shoe carries the brake lining, which is riveted or glued to the shoe. When the brake is applied, the shoe moves and presses the lining against the inside of the drum. The friction between lining and drum provides the braking effort. Energy is dissipated as heat.

As the brake linings wear, the shoes must travel a greater distance to reach the drum. Therefore, it is known to equip the cam brake arrangements with a mechanism that enables to adjust the rest position of the shoes when the distance between the drum and shoes reaches a certain point. Precisely, the brake shoes are moved radially outwards so as to be closer to the drum. Such mechanism, which is also known as "slack adjuster", can be manual or automatic (self-adjusting) and is built into the brake lever connecting the push rod to the brake shaft.

U.S. Pat. No. 4,596,319 discloses an example of an automatic slack adjuster for vehicle brakes.

In order to overcome some packaging constraints in the vehicle architecture, the brake lever is not straight, but includes angled parts. This means that there is an angle between the line extending between the two connection points of the brake lever and the plane perpendicular to the axis of rotation of the brake shaft. The greater the offset, the greater the angle.

The offset usually ranges from 0 to 70 mm. However, when the offset is high, e.g. about 70 mm, significant lateral loads are induced on the brake shaft during actuation of the brake, causing wear and tear on the brake shaft splines and accelerating the damage on the slack adjuster itself.

SUMMARY

An object of the invention is to provide a new brake lever design that allows better withstanding to lateral stress.

The object is achieved by a brake lever according to claim 1.

By the provision of a brake lever which comprises a stiffening member, the advantage is that the stiffening member absorbs at least a part of the lateral efforts to which the brake shaft is exposed in the connection area with the brake shaft.

Further advantages and advantageous features of the invention are disclosed in the following description.

The invention also concerns a drum brake and a heavy-duty vehicle.

BRIEF DESCRIPTION OF THE DRAWINGS

With reference to the appended drawings, below follows a more detailed description of three embodiments of the invention cited as examples.

In the drawings:

FIG. 2 is a perspective view of a vehicle axle, comprising two end wheel brakes, typically two drum brakes of prior art;

FIG. 3 is a partial view along the arrow III in FIG. 2;

FIG. 7 is a view similar to FIG. 4, representing a brake lever according to a second embodiment of the invention;

FIGS. 8 and 9 are side views of the brake lever of FIG. 7; and

FIGS. 10 to 12 represent views of a brake lever according to a third embodiment of the invention.

DETAILED DESCRIPTION OF EXAMPLE EMBODIMENTS OF THE INVENTION

Figure 1:
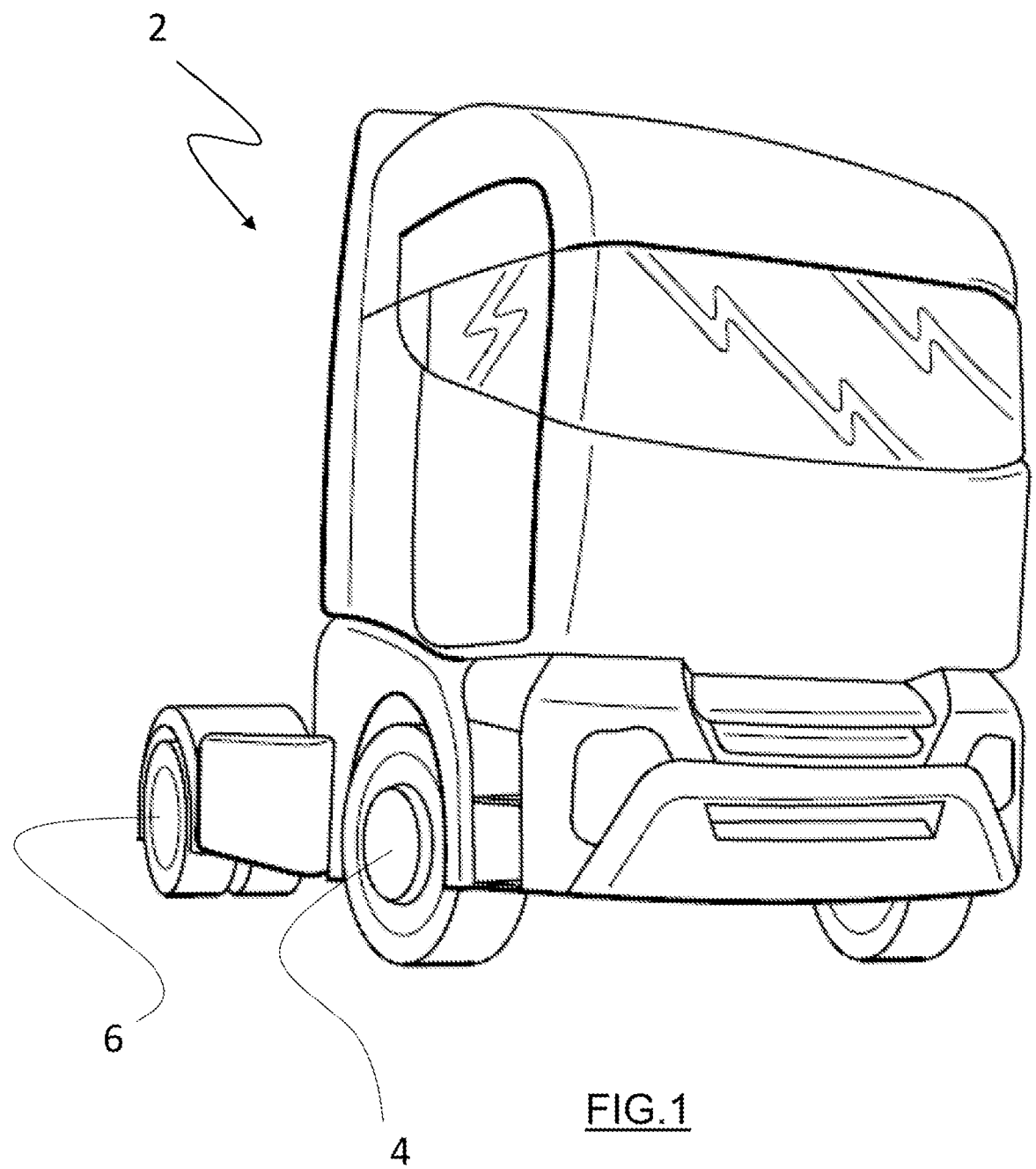
FIG. 1 is a perspective a view of a vehicle, typically a truck, comprising at least one drum brake provided with a brake lever of the invention.

FIG. 1 represents a heavy-duty vehicle 2, which, in the example, is a truck.

The truck 2 includes a front axle 4 and a rear axle 6. In the example, the truck is a 4 by 2 truck, i.e. a truck with four wheels in which torque is delivered to only two wheels.

Obviously, the invention is applicable to other truck configurations, such as 6 by 4 trucks and 6 by 2 trucks.

The rear axle 6 is better represented on FIG. 2. For the clarity of the drawings, the wheels are not represented.

In known manner, rear axle 6 includes an axle housing 8 inside which a differential (not visible) is arranged. The differential includes an orifice for receiving one end of a propeller shaft 10.

The axle 6 further includes two wheel brakes 12 provided each at one longitudinal end of the axle 6.

Each wheel brake 12 is an air brake or, more formally, a compressed air brake system, which is a type of friction brake in which compressed air pressing on a piston is used to apply the pressure to the brake pad (not shown) needed to stop the vehicle 2. In this respect, the vehicle 2 includes an air tank and a compressor (not represented).

In the example, each wheel brake 12 is a drum brake that is applied by brake shoes (not shown) being pressed against a brake drum 16. There are a number of different types of drum brakes, where the difference lies in the mechanism that transmits the braking force the brake cylinder to the brake lining. In particular, drum brakes include cam brakes and wedge brakes.

Typically, each wheel brake 12 includes a cam actuation mechanism, in which a brake cylinder 18, also known as an "air cylinder", converts the energy of compressed air to mechanical operation. In the example, each wheel brake 12 has its own brake cylinder 18, which means that there are two brake cylinders 18 fitted on the axle.

Each brake cylinder 18 consists of two chambers (not shown) separated by a rubber diaphragm (not shown either). When the brake pedal is depressed, air flows into the cylinder 18 and pushes the diaphragm against a push rod 14 (also known as "piston"). This causes the push rod 14 to move out from the cylinder 18 and to push on a rotating lever 20 (also known as "brake lever" or "brake arm"). The rotating lever 20 transforms the force of the push rod 14 into a torque that is applied to a brake shaft 22. Therefore, brake lever 20 is designed for transmitting the movement of cylinder rod 14 to brake shaft 22.

Preferably, brake lever 20 is made of metal or an alloy.

To be clear, FIGS. 2 and 3 show a traditional drum brake. The invention specifically concerns the brake lever 20 as represented on the FIG. 4 and following. In other words, the brake lever that is represented on FIGS. 2 and 3 is a brake lever of prior art. The brake lever 20 according to the invention is represented on FIG. 4 and following.

A cam (not shown), e.g. a S-shaped cam, is arranged at the end of the brake shaft 22. As the cam rotates, it forces two symmetrical brake pads (not shown) against the brake drum 16 until the pressure is released and the brake pads return to their resting position. The brake shoe carries the brake lining, which is riveted or glued to the shoe. When the brake is applied, the shoe moves and presses the lining against the inside of the drum 16. The friction between lining and drum provides the braking effort. Energy is dissipated as heat.

In the example, brake lever 20 comprises a first portion 20a delimiting a hole 24 for fitting the brake shaft 22. Accordingly, hole 24 comprises a central axis X24 that is confounded with the axis of rotation of the brake shaft 22.

Basically, the brake shaft 22 extends longitudinally parallel to the rotation axis of the wheels (in neutral configuration obviously, i.e. when steering angle is of 0°).

In the embodiment of the figures, brake lever 20 further comprises a second portion 20b, which is configured to be pivotally connected to the cylinder rod 14. In this respect, the second portion 20b includes a circular bore 30 for receiving a pin (not shown) attached to one end of the push rod 14. Bore 30 defines a central axis X30 that represents the axis of rotation of the brake lever 20 relative to the push rod 14. Axes X24 and X30 are parallel one with the other.

In the example, bore 30 is a through hole.

As the brake linings wear, the shoes must travel a greater distance to reach the drum 16. Therefore, brake lever 20 includes a mechanism (not shown) that enables to adjust the rest position of the shoes when the distance between the drum and shoes reaches a certain point. Precisely, the brake shoes are moved radially outwards so as to be closer to the drum. Such mechanism, which is known as "slack adjuster", can be manual or automatic (self-adjusting) and is built into the brake lever 20 connecting the push rod 14 to the brake shaft 22.

Typically, the slack adjuster is housed inside the first portion 20a of the brake lever 20. In known manner, brake lever 20 and brake shaft 22 are coupled using a dog gear mechanism: The hole 24 is part of a crown wheel (that is partially visible on FIG. 4), which is itself part of the slack adjuster and the crown wheel comprises, on the inside, a succession of teeth that engage into complementary splines provided on the brake shaft 22. This enables to rigidly secure the crown wheel of the brake lever 20 in rotation with the brake shaft 22.

A plane P1 is defined as the plane, perpendicular to the central axis X24, passing by a connection point A between the rotating lever 20 and the push rod 14 and. A plane P2 is defined as the plane, perpendicular to that of FIG. 5, extending between point A and a connection point B between brake lever 20 and brake shaft 22. A plane P3 is defined as the plane passing by point B and perpendicular to the central axis X24 of the hole 24.

Preferably, the first and second portions 20a, 20b are end portions of the brake lever 20. Portion 20b is flat, which means that it extends parallel to plane P1.

In order to overcome some packaging constraints in the vehicle architecture, the first portion 20a and the second portion 20b are offset from each other with respect to the central axis X24 of the hole 24. In other words, planes P1 and P3 are spaced one from the other by a distance (or "offset") d1.

In this respect, the brake lever 20 is not straight, but includes angled parts. Precisely, brake lever 20 further includes a central portion 20c extending between the first and second portions 20a, 20b. The central portion 20c extends obliquely with respect to the second portion 20b. This means that there is an angle θ between the planes P1 and P2. The greater the offset d1, the greater the angle θ. Therefore, the first portion 20a of brake lever 20 is offset with respect to the second portion 20b.

The offset d1 ranges from 0 to 70 mm. In the example of the figures, the offset d1 is high, e.g. about 70 mm. Accordingly, significant lateral loads are induced on the brake shaft 22 during actuation of the brake, causing wear and tear on the brake shaft splines and accelerating the damage on the slack adjuster mechanism.

Figure 5:
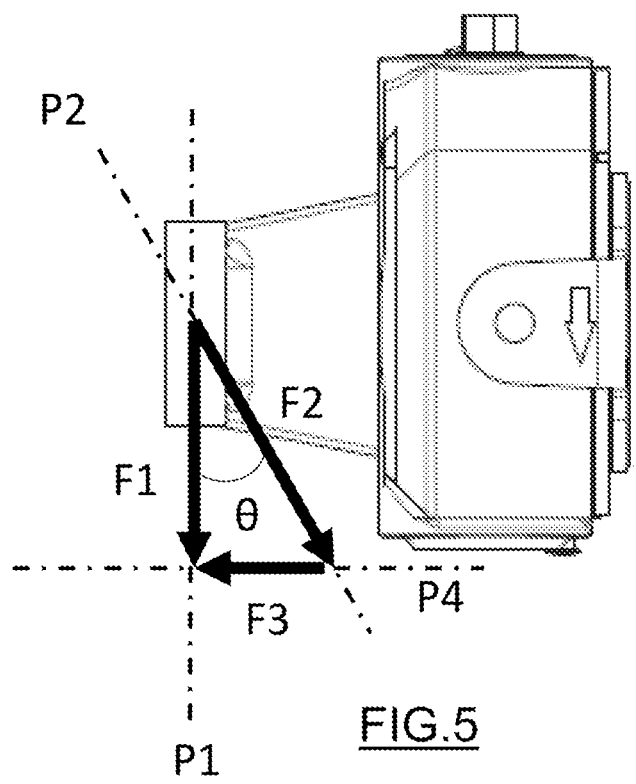
FIG. 5 is a top view of the brake lever.
Figure 6:
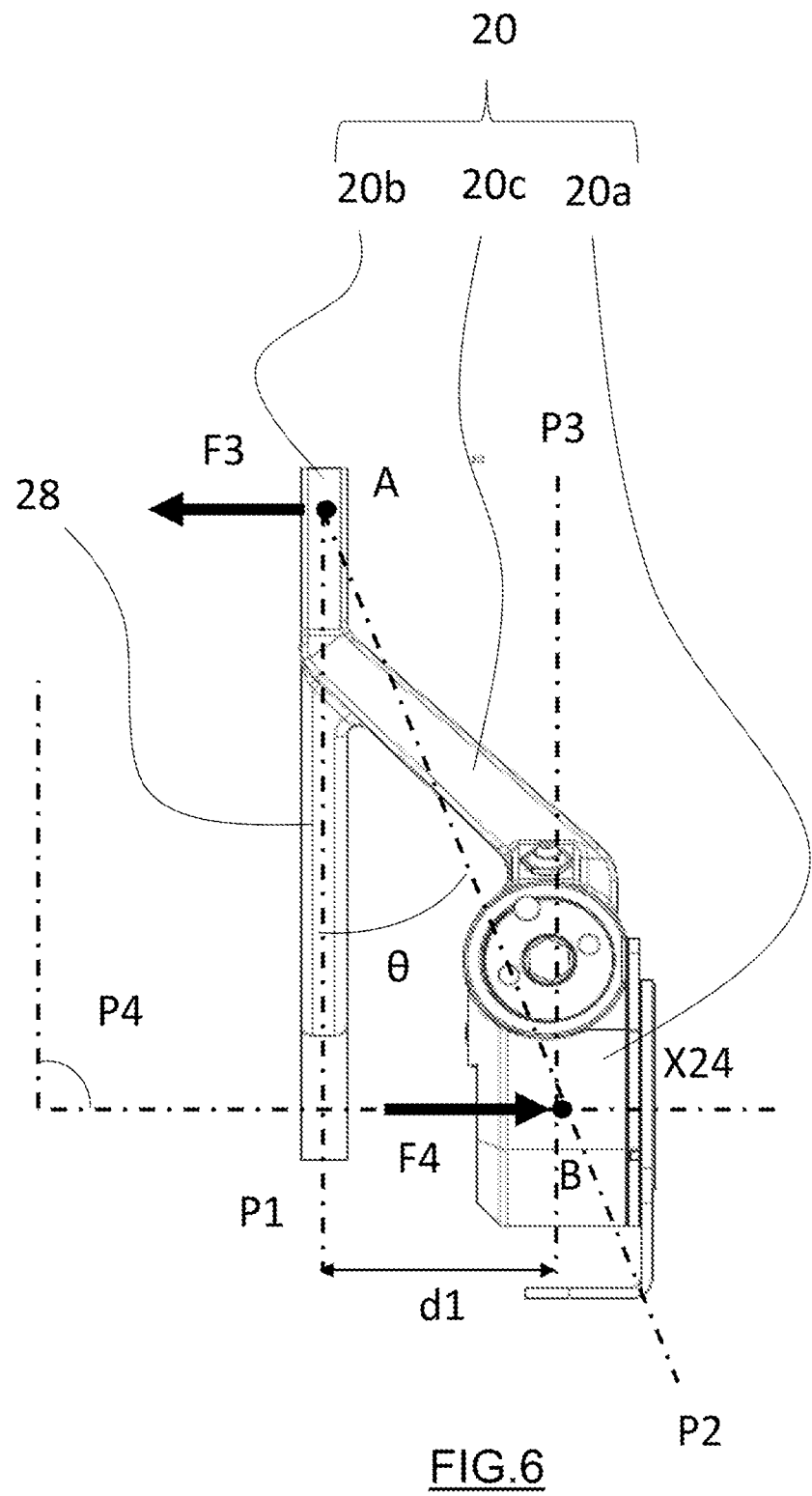
FIG. 6 is a side view of the brake lever.

More precisely, and referring to FIGS. 5 and 6, as an angle θ exists between planes P1 and P2, the force F1 applied by the push rod 14 can be decomposed into a first force F2 corresponding to the projection of the force F1 into plane P2 and a second force F3 corresponding to the projection of the force F1 into a plane P4 corresponding to the plane of FIG. 5, perpendicular to planes P1 and P3. Plane P4 includes axes X30 and X24.

As there is no displacement of the brake lever 20 along axis X24, i.e. no degree of freedom in that direction, the brake shaft 20 exerts on brake lever 20 a force F4 that balances force F3. This force F4, known as "lateral load", can cause wear and tear on the brake shaft splines (not shown) and accelerate the damage on the slack adjuster mechanism.

In order to absorb that lateral effort F4, and to avoid premature wear of the brake lever 20, the brake lever 20 further includes a stiffening member 28 that extends along a direction L1 contained inside the plane P1 and that includes an orifice 32 for fitting the brake shaft 22.

In the embodiment of FIGS. 1 to 9, the stiffening member 28 extends from the second portion 20b, which means that it forms an extension of the second portion 20b.

In the alternative embodiment of FIGS. 10 to 12, the stiffening member 28 extends from the central portion 20c. Accordingly, the stiffening member 28 is offset from the second portion 20b with respect to the central axis X24 of the hole 24. In other words, stiffening member 28 extends along a direction contained inside a plane P5 that is perpendicular to the central axis X24 of the hole and that is spaced from plane P3 by a distance (or "offset") d2 that is inferior to d1.

In the example, orifice 32 is a through hole of circular shape.

Obviously, the orifice 32 is preferably coaxially aligned with the hole 24.

The stiffening member 28 is not designed for transmitting any torque to the brake shaft 22: The diameter of the orifice 32 is large enough to fit the end of the brake shaft 22, with a radial clearance that allows the brake shaft 22 to rotate inside the orifice 32. As a matter of fact, the orifice 32 acts as a bearing that supports the rotation of the brake shaft 22. Accordingly, the stiffening member 28 acts as a support leg.

Basically, the diameter of orifice 32 is inferior to that of hole 24. Therefore, in the example, the brake shaft 22 is a stepped shaft, provided with at least one radial shoulder (not shown) allowing to have a reduced outer diameter at the end.

Figure 4:
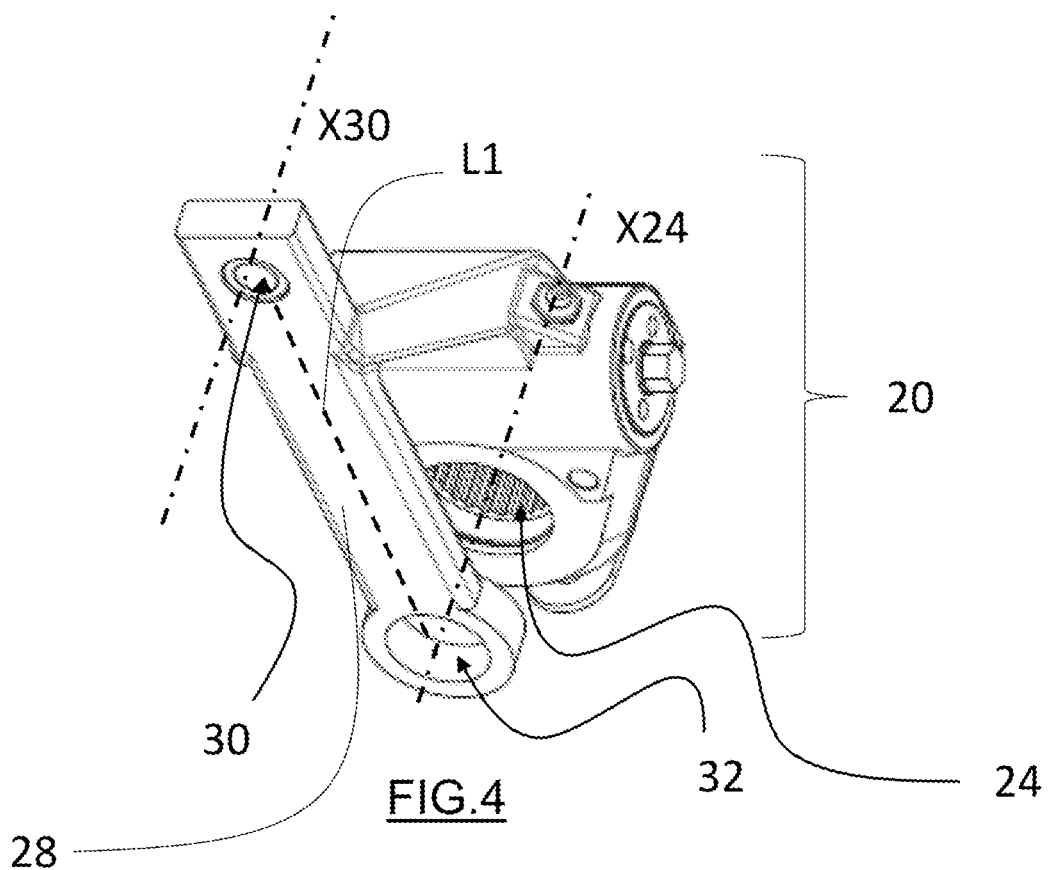
FIG. 4 is a perspective view of a brake lever according to a first embodiment of the invention.

In the example of FIGS. 4 to 6, the stiffening member 28 extends perpendicular to the central axis X24 of hole 24, which means that direction L1 is a straight line.

FIGS. 7 to 9 represent a second embodiment of a brake lever 20. For the purpose of clarity, the numeral references used herein are the same than that of the first embodiment.

In this second embodiment, the stiffening member 28 extends in a curved manner. More precisely, the stiffening member 28 is in the form of a curl (or comma-shaped). The advantage of having this curved stiffening member 28 is that it can match with the shape of the axle housing 8.

In other words, the direction L1 along which extends the stiffening member 28 is a curved line contained inside the plane P1.

In this example, the orifice 32 delimited at the end of the stiffening member 28, which is of circular shape, has a diameter similar to that of the brake shaft 22, which means that there is no need to modify the brake shaft 22.

In this example, orifice 32 is a through hole of circular shape.

Advantageously, the orifice 32 is delimited inside a casing 40 extending parallel to axis X24 between the stiffening member 28 and portion 20a. In other words, casing 40 makes the junction between stiffening member 28 and portion 20a of brake lever 20. The casing 40, of cylindrical shape, is arranged around the end of the brake shaft 22. This enables to increase the robustness of the brake lever 20, to offer a better protection against dust and to provide a better axial support of the brake shaft 22.

It is to be understood that the present invention is not limited to the embodiments described above and illustrated in the drawings; Rather, the skilled person will recognize that many changes and modifications may be made within the scope of the appended claims.

The invention claimed is:

1. A brake lever for a drum brake arrangement, said brake lever being designed for transmitting the movement of a cylinder rod to a brake shaft, wherein the brake lever comprises a first portion delimiting a hole for fitting the brake shaft, and a second portion which is configured to be pivotally connected to the cylinder rod, and wherein the first portion and the second portion are offset from each other with respect to a central axis of the hole,
   the brake lever further includes a central portion extending in a straight line between the first and second portions, the central portion extending obliquely with respect to the second portion, a stiffening member that extends along a direction contained inside a plane perpendicular to the central axis of the hole, and includes an orifice for fitting the brake shaft, and an automatic or manual slack adjuster,
   wherein the stiffening member is spaced apart from the slack adjuster.

2. The brake lever according to claim 1, wherein the stiffening member extends in a straight line perpendicular to the central axis of the hole.

3. The brake lever according to claim 1, wherein the stiffening member extends in a curved manner.

4. The brake lever according to claim 1, wherein the first and second portions are end portions of the brake lever.

5. The brake lever according to claim 1, wherein the second portion includes a circular bore for receiving a pin.

6. The brake lever according to claim 1, wherein the offset between the first portion and the second portion is less than or equal to 70 mm.

7. The brake lever according to claim 1, wherein the orifice and the hole have the same diameter.

8. The brake lever according to claim 1, wherein the orifice is a through hole of circular shape.

9. The brake lever according to claim 1, wherein the orifice is delimited by a casing extending axially between the stiffening member and the first portion.

10. A brake lever is according to claim 1, including a drum brake arrangement, comprising a brake cylinder provided with a push rod, a brake shaft and a brake lever for transmitting the movement of the push rod to the brake shaft.

11. A heavy-duty vehicle, comprising at least one drum brake arrangement according to claim 1.

* * * * *